United States Patent
Daly et al.

(10) Patent No.: US 12,271,788 B2
(45) Date of Patent: Apr. 8, 2025

(54) HYBRID USER CONTRIBUTED RULES AND MACHINE LEARNING FRAMEWORK

(71) Applicant: International Business Machines Corporation, Armonk, NY (US)

(72) Inventors: Elizabeth Daly, Dublin (IE); Rahul Nair, Dublin (IE); Oznur Alkan, Clonsilla (IE); Massimiliano Mattetti, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1132 days.

(21) Appl. No.: 17/140,487

(22) Filed: Jan. 4, 2021

(65) Prior Publication Data

US 2022/0215285 A1    Jul. 7, 2022

(51) Int. Cl.
*G06N 20/00*  (2019.01)
*G06N 5/02*   (2023.01)

(52) U.S. Cl.
CPC .............. *G06N 20/00* (2019.01); *G06N 5/027* (2013.01)

(58) Field of Classification Search
CPC ........ G06N 20/00; G06N 3/042; G06N 5/027; G06N 5/045
See application file for complete search history.

(56) References Cited

U.S. PATENT DOCUMENTS

| | | | |
|---|---|---|---|
| 9,218,574 B2 | 12/2015 | Phillipps et al. | |
| 9,305,263 B2 | 4/2016 | Horvitz et al. | |
| 10,322,507 B2 | 6/2019 | Meier et al. | |
| 2019/0156216 A1* | 5/2019 | Gupta | G06N 20/00 |
| 2020/0118008 A1 | 4/2020 | Alkan et al. | |
| 2020/0151555 A1 | 5/2020 | Kozhaya et al. | |
| 2021/0049512 A1* | 2/2021 | Chatterjee | G06N 5/025 |
| 2021/0110293 A1* | 4/2021 | Lehr | G06N 20/00 |

(Continued)

FOREIGN PATENT DOCUMENTS

| | | | | |
|---|---|---|---|---|
| JP | 6492880 B2 | 4/2019 | | |
| KR | 10-2043563 B1 | 11/2019 | | |
| WO | WO-02073521 A2 * | 9/2002 | ........... | G06K 9/6228 |

(Continued)

OTHER PUBLICATIONS

Lindgren, T., "Methods for Rule Conflict Resolution", ECML 2004, LNAI 3201, pp. 262-273, https://link.springer.com/content/pdf/10.1007%2F978-3-540-30115-8_26.pdf, Accessed on Jan. 4, 2021.

(Continued)

*Primary Examiner* — Chau T Nguyen
(74) *Attorney, Agent, or Firm* — Scully. Scott, Murphy & Presser, P.C.; Yuanmin Cai

(57) ABSTRACT

A machine learning model can be run with a first input data to obtain a first output from the machine learning model. A first rule representing an interpretable explanation for the machine learning model predicting the first output can be obtained. A modified rule can be received, which changes the first rule. A transformation function can be generated, which transforms a given input data for inputting to the machine learning model to a new input data based on decision boundaries of the machine learning model and the modified rule. The first rule, the first output, the modified rule, and the transformation function can be stored in a first table.

20 Claims, 8 Drawing Sheets

(56) References Cited

U.S. PATENT DOCUMENTS

2022/0129791 A1* 4/2022 Nia .................. G06N 20/00
2022/0156614 A1* 5/2022 Dalli ................ G06N 20/00

FOREIGN PATENT DOCUMENTS

| WO | 2018/094105 A2 | | 5/2018 | |
|---|---|---|---|---|
| WO | 2019/133919 A1 | | 7/2019 | |
| WO | WO-2020089597 A1 | * | 5/2020 | ............. G06N 5/045 |

OTHER PUBLICATIONS

Kulesza, T., et al., "Principles of Explanatory Debugging to Personalize Interactive Machine Learning", IUI 2015, Apr. 26-May 1, 2015, pp. 126-137.

Teso, S., et al., "Explanatory Interactive Machine Learning", AIES '19: Proceedings of the 2019 AAAI/ACM Conference on AI, Ethics, and Society, Jan. 2019, 7 pages.

Wilder, B., et al., "Learning to Complement Humans", arXiv preprint arXiv:2005.00582v1, May 1, 2020, 8 pages.

Ustun, B., et al., "Actionable Recourse in Linear Classification", arXiv:1809.06514v2, Nov. 9, 2019, 28 pages.

Stumpf, S., et al., "Toward Harnessing User Feedback for Machine Learning", IUI'07, Jan. 28-31, 2007, 11 pages.

Kim, B., Interactive and Interpretable Machine Learning Models for Human Machine Collaboration, Submitted to the Department of Aeronautics and Astronautics on May 18, 2015, in partial fulfillment of the requirements for the degree of Doctor of Philosophy in Aeronautics and Astronautics, Massachusetts Institute of Technology, https://beenkim.github.io/papers/BKimPHDThesis.pdf, Accessed on Jan. 4, 2021, 143 pages.

NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

HYBRID USER CONTRIBUTED RULES AND MACHINE LEARNING FRAMEWORK

BACKGROUND

The present application relates generally to computers and computer applications, and more particularly to machine learning.

Machine learning (ML) models are trained on historical data which is the result of many hidden processes such as industry rules and logic. As industry rules and logic change, an ML solution built on previous rules or data may require retraining in order to capture such changing dynamics. Retraining, however, can be costly and further challenging is obtaining labeled data that accurately reflects the current decision landscape or decision boundaries needed for learning the new logic.

Artificial intelligence (AI) is increasingly integral in many real world tasks from loan approval to forecasting organizational revenue. While ML tasks such as a classification perform well with appropriate historical data, to support more dynamic situations, they may need frequent updating to be able to provide decisions that accurately reflect the current state. Consider a loans approval application where there exists a policy that a loan request should be accepted for any user with age>30^income>50 k^education="Level A" and a machine learning model has been trained based on historical data to predict if a user will be approved or not leveraging many other features other than the three mentioned in the logic. Now consider a new policy comes into place where the rule changes from age>30 to age>26. Based on historical data the machine learning model may incorrectly reject users between the ages 26-30. Options may include removing old data. However, this should be done in tandem with collecting new data that accurately reflects the new decision boundaries, which is achieved by either relabeling historical data or waiting for new data to be provided with the correct labels. These approaches can result in a lack of data for some instances' coverage and may be time consuming, making it less appropriate, for example, in applications where decision processes or policies may change.

BRIEF SUMMARY

The summary of the disclosure is given to aid understanding of a computer system and a method of improving machine learning framework, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the system and/or its method of operation to achieve different effects.

A method, in one aspect, can include running a machine learning model with a first input data to obtain a first output from the machine learning model. The method can also include obtaining a first rule representing an interpretable explanation for the machine learning model predicting the first output. The method can further include receiving a modified rule, which changes the first rule. The method can also include generating a transformation function, which transforms a given input data for inputting to the machine learning model to a new input data based on decision boundaries of the machine learning model and the modified rule. The method can further include storing the first rule, the first output, the modified rule, and the transformation function in a first table.

A system, in one aspect, can include at least one processor and a memory device coupled with the at least one processor. The at least one processor can be configured to run a machine learning model with a first input data to obtain a first output from the machine learning model. The at least one processor can also be configured to obtain a first rule representing an interpretable explanation for the machine learning model predicting the first output. The at least one processor can also be configured to receive a modified rule, which changes the first rule. The at least one processor can also be configured to generate a transformation function, which transforms a given input data for inputting to the machine learning model to a new input data based on decision boundaries of the machine learning model and the modified rule. The at least one processor can also be configured to store the first rule, the first output, the modified rule, and the transformation function in a first table.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
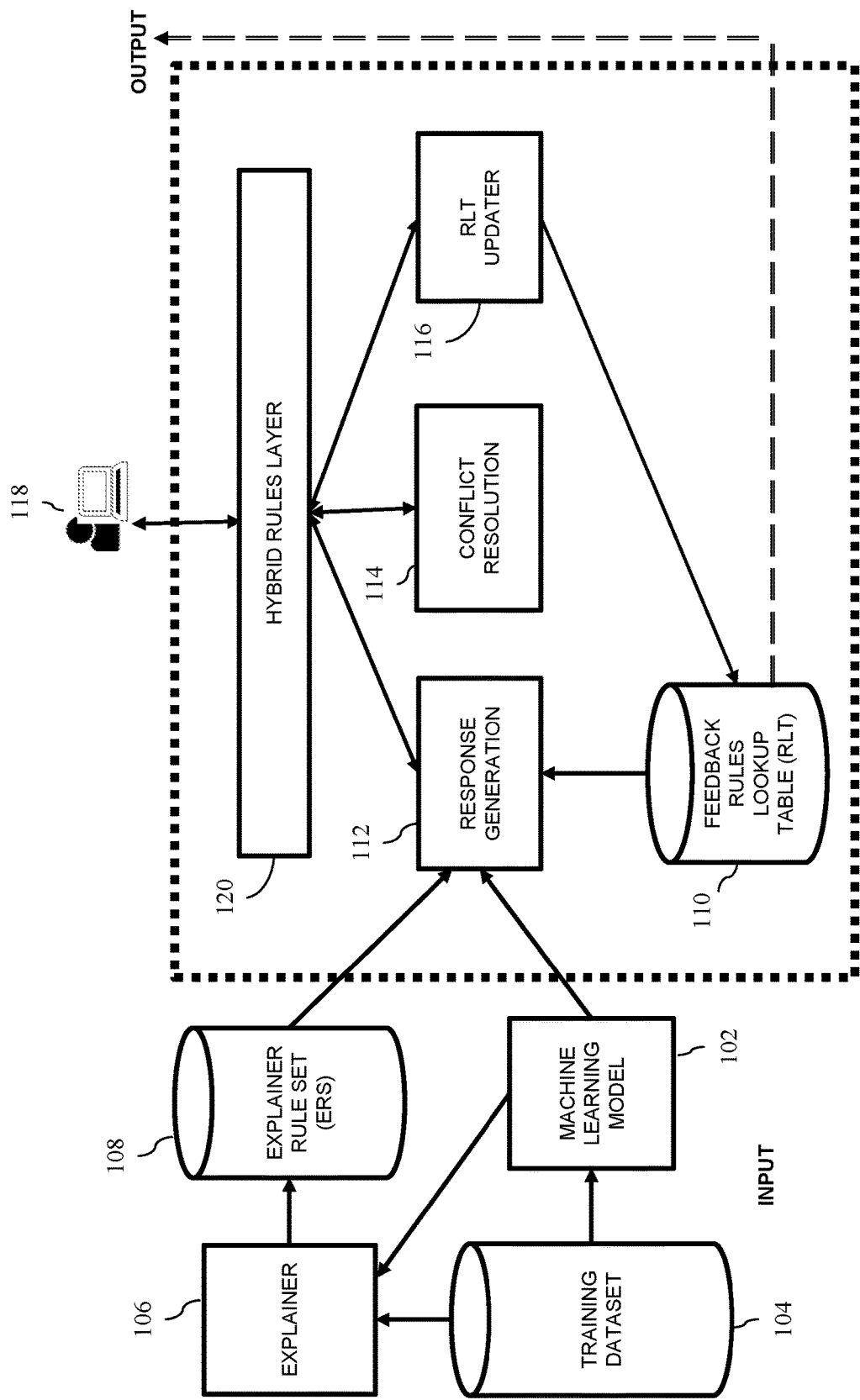
FIG. 1 is a diagram illustrating components of system in an embodiment.

In one or more embodiments, a system and method are disclosed, which can support constraints and adjustments to machine learning models. In an embodiment, the constraints and adjustments are contributed by a user. The system and method in one or more embodiment, for example, can leverage the predictive power of machine learning models with contributed decision rules, for instance, use machine learning models while allowing the user or another to specify modifications to decision boundaries. For example, interactive overlay approach in an embodiment can allow machine learning models to work with modified rules, without requiring model retraining. In an embodiment, for example, feedback rules such as user feedback rules can be layered with the machine learning predictions to provide immediate changes which in turn support learning with less data.

In some scenarios, the data used to train an existing machine learning (ML) model may not reflect the current decision criteria. Additionally, the data may be lacking external knowledge such as policies or policy changes. In an embodiment, the system and method allow for leveraging an underlying ML model, which may not have been retrained with updated data, by storing a series of adjustments reflected as decision rules that can be applied to push future instances to the appropriate decision boundary in order to reflect the constraints or user constraints. In embodiment, a modifiable layer can support immediate changes and influce over an existing ML model. In an embodiment, the system and method, for example, leverage an existing ML model, while allowing users to provide rule based modifications that adjust the final decision making criteria allowing the users to adjust the predictions for specified parameters. In an embodiment, an explainable interactive overlay can be provided that supports modifications to an existing ML model decision process without retraining the model.

While the description herein may provide examples of the binary classification problem, it is understood that the system and method in one or more embodiments can work with multi-class classification problem as well.

By way of example, a binary classification problem can be considered. For example, consider a domain D(X,Y), from which n samples are drawn $(x_i, y_i)$, $i \in \{1, \ldots, n\}$ with labels $y_i \in \{0,1\}$.

In an embodiment, by way of example, a rule R can be expressed as a tuple R(e,p), where e is a boolean clause, and p is the class label assigned to all the instances satisfying e. A clause is a conjunction of conditions over a subset of features in X.

In an embodiment, by way of example, a condition can be a triple (variable, comparison operator, value) where the variable represents a feature in X and the comparison operator can be one in the set $\{`=`,`\neq`,`>`,`\geq`,`<`,`\leq`\}$. Other comparison operators can be included in the set.

In an embodiment, by way of example, in rule satisfiability, an instance $x_i$ satisfies a clause e if all the conditions in e are evaluated to True on $x_i$. By extension, an instance $x_i$ satisfies a rule R(e,p) if $x_i$ satisfies the boolean clause e in R. Formally, a boolean clause can be defined as a function e: $X \rightarrow \{0,1\}$, and an instance $x \in X$ satisfies $e \Leftrightarrow e(x)=1$.

In an embodiment, by way of example, a feedback rule can be expressed as a feedback rule (FR) which can be defined as a triple of the form FR(R, R', T), where R contains the original rule, R' contains the feedback (e.g., user feedback), which is the modified version of R (with e' and p' indicating the boolean clause and the class label of the modified rule, respectively), and T stores the transformation function.

In an embodiment, by way of example, referring to conflicting rules, two rules $R_1(e_1,p_1)$ and $R_2(e_2,p_2)$ are conflicting if there exists at least one instance $x_i$ that satisfies $e_1$ and $e_2$ but $p_1 \neq p_2$.

In an embodiment, a transformation function is a function that modifies an input instance $x_i$ which previously satisfied a rule R so as to turn it into an instance $x_i'$ that satisfies a modified rule R'.

FIG. 1 is a diagram illustrating components of system in an embodiment. The components shown include computer-implemented components, for instance, implemented and/or run on processors or computer processors such as one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors. A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

Machine learning model 102 can be any machine learning model such as neural networks, multi-layer perceptrons, deep learning models, and/or others. Training data set 104 include data used in training the machine learning model 102. For example, machine learning model 102 is built or trained on the training data set 104.

Explainer 106 can be any explainer that outputs rules. In an embodiment, Explainer 106 output rules in the form of Boolean expressions as explanation for the machine learning model's decision or decision process. Explainability in artificial intelligence (AI), for example, associated with machine learning models, makes the decision making process of such machine learning models understandable to a user. Explainer 106 can implement different approaches or techniques such as calculating feature importance, finding similar instances from past predictions or identifying what features are present or missing to support the prediction, known as contrastive explanations. Existing technique or tools can be employed for implementing Explainer 106. Explainer 106 provides interpretable explanation as to how the machine learning model 102 made its decision or prediction. In an embodiment, interpretable explanation can be provided in a form of one or more rules such as Boolean rules.

A table, for example, Feedback rules lookup table (RLT) 110 (also referred to as a first table for explanation purposes only), can be empty initially is can be built based on adjustments made to one or more interpretable explanation rules, for example, provided by Explainer 106. The table can be a data store, for example, having a data structure format.

Explainer Rule Set (ERS) 108 includes or stores one or more explanation rules provided by Explainer 106. For example, ERS 108 can be built on Training dataset 104 and labels of Machine learning model 102. In an embodiment, each rule in ERS 108 can be in the form of a decision rule, e.g., "if predicates then prediction." In an embodiment, Machine learning model 102, Training dataset 104, Explainer 108 can be used as inputs to create or build ERS 108.

RLT updater 116 builds RLT 110. For instance, RLT updater 116 can receive as input an instance I, Machine learning model 102 prediction P given instance I, optionally a modified label P referred to as P', explanation rule R and modified explanation R', e.g., R→R'. Based on those input, RLT updater can define or generate an instance transformation function T such that the transformation function transforms the instance I to a new input instance I', e.g., T(I)→I', where all conditions in R' apply to I'. RLT 110 stores R', P'

(optionally) and T, for example, as an entry in the table or RLT 110. For example, store entry <R, P>→{R', P', T} in RLT 110.

For example, in an embodiment, Machine learning model 102 can be run with a first input data to obtain a first output. The first input data can be received, for example, from a user 118. A rule (also referred to as a first rule for explanation purposes only) representing an interpretable explanation for the Machine learning model 102 predicting the first output can be obtained, for example, from running Explainer 106. For instance, the first rule can be obtained from ERS 108. RLT updater 116 can receive a modified rule, which changes the first rule, for example, from the user 118. In an embodiment, the modified rule changes a condition specified in the first rule. In an embodiment, the modified rule changes an output label associated with the first rule. RLT updater 116 can generate a transformation function, which transforms a given input data for inputting to Machine learning model 102 to a new input data based on decision boundaries of Machine learning model 102 and the modified rule. RLT updater 116 can store the first rule, the first output, the modified rule, and the transformation function in RLT 110. In an embodiment, the first table can be structured such that first table is indexed at least by the first rule.

Using RLT 110 with stored feedback rules, for example, as described above in an embodiment, the system can provide response generation 112. In an embodiment, response generation 112 can receive as input an instance I, machine learning model 102, ERS 108, RLT 110, and provide machine learning model's prediction, which may be updated based on one or more feedback rules, and explanation rule for that updated prediction. For example, response generation 112 can retrieve rule R from ERS 108 that applies to the instance I. Retrieving a rule, R, from ERS 108 can include, given instance I, Machine learning model's prediction P and ERS 108, retrieving R e ERS where all conditions in R apply to I.

Response generation 112 and retrieves entry <R, P>→{R', P', T} from RLT 110. If entry exists and R applies to instance I, Response generation 112 transforms I to I' using the transformation function T, e.g., applies T to I→I'. Machine learning model 102 is run with I' as input, and Machine learning model 102 output or prediction (e.g., ML(I')) is obtained. Response generation 112 may return to the user 118 the generated prediction (e.g., ML(I')). If transformation is not applied, Response generation 112 may return ML(I), prediction based on instance I. In addition, explanation of Machine learning model's 102 decision process can be returned, for example, the modified rule, R' can be returned. In the case where ML(I) is returned, associated explanation would be the original rule, R.

For example, in an embodiment, Machine learning model 102 can be run with a given input data, where Machine learning model 102 generates a second output data. A second rule representing an interpretable explanation for Machine learning model predicting the second output can be obtained, for example, from ERS 108. A table (also referred to as the first table), e.g., RLT 110, can be searched for an entry associated with the second rule. Responsive to finding the entry and determining that the given input data satisfies the modified rule in the entry, the given input data can be transformed to the new input data using the transformation function in the entry. Machine learning model 102 can be run with the new input data. Results of the run and/or explanation can also be provided, for example, to the user 118.

In an embodiment, Hybrid rules layer 120 orchestrates interactions between the user 118 and the components of the system. For example, Hybrid rules layer 120 can receive user input such as user feedback rules input data instances, and provide to the user, machine learning model predictions and associated explanation. Hybrid rules layer 120, in an embodiment, also orchestrates interactions between the components of the system, for example based on user feedback.

In an embodiment, Conflict resolution 114 detects conflicts between rules in RLT 116 and ERB 108 and a new feedback rule, for example, input by the user 118. In an embodiment, conflicts can be resolved through user interaction. By way of example, existing techniques can be used to detect conflicts in rule-based systems.

In an embodiment, the system may take as an input: a machine learning (ML) model 102, an explainer that outputs an Explainer Rule Set (ERS) 108 to represent the decision-making process of an ML model, a series of user modifications to clauses or rules (e.g., in ERS) and an input data instance. In an embodiment, the system may provide an output: a machine learning model prediction, the original explanation or rule representing the decision for the data point, the transformation applied to the input instance, the hybrid prediction along with the user modified clause to reflect the new prediction which takes into account both the ML model prediction and the user feedback rule. In an embodiment, a Rule Lookup table (RLT) 110 stores the user modifications, which can be managed by the RLT Updater 116. A Response Generation or Generator 112 can be responsible for retrieving a given rule R to represent an input instance and for generating the transformation necessary to make an input instance I→I' to reflect the user modified rule R'. A rule conflict resolver 114 may resolve conflicts between rules.

Figure 2:
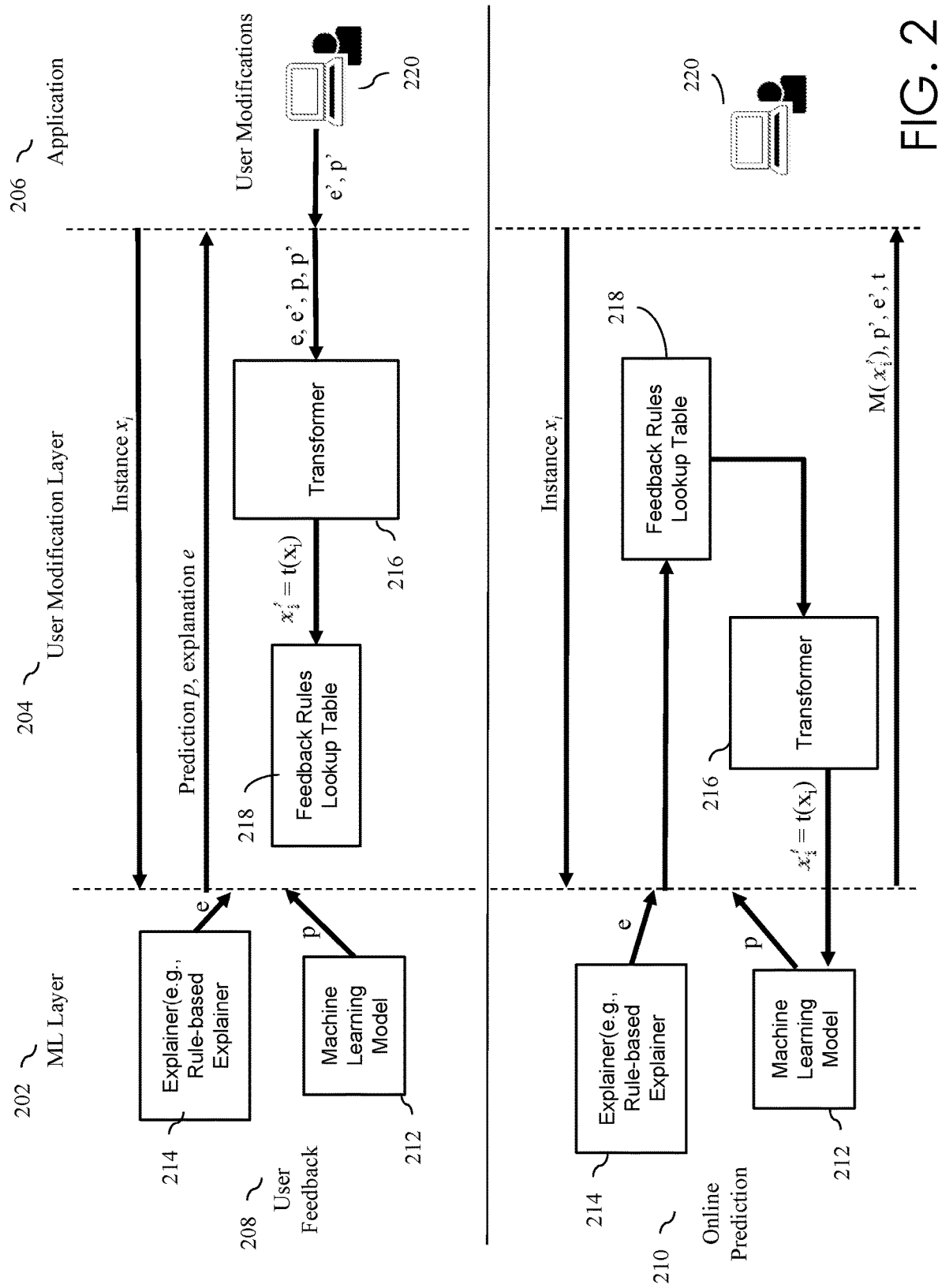
FIG. 2 is a diagram illustrating an overview of an interactive overlay associated with machine learning in an embodiment.

FIG. 2 is a diagram illustrating an overview of an interactive overlay associated with machine learning in an embodiment. In an embodiment, for example, as discussed with reference to FIG. 1, an interactive overlay solution to machine learning can be provided. In an embodiment, the overlay can includes layers: Machine Learning (ML) Layer 202, User Modification Layer 204 and Application Layer 206. To illustrate a framework for a system and method disclosed herein in one or more embodiments, the processes of the solution are shown separated in FIG. 2, processing user feedback (upper) 208, and making online predictions (lower) 210. In an embodiment, one or more processors may run a machine learning model with provided input instance $x_i$. The machine learning model outputs its decision or prediction p. One or more processors may obtain an explanation e, e.g., interpretable explanation, explaining a decision process of the machine learning model's prediction p, for example, by running an explainer 214 and/or accessing a stored set of explanations. The obtained explanation in an embodiment is a rule-based explanation, for example, in a form of a rule such as a Boolean rule. To obtain or receive feedback, one or more processors of a system may present to the user 220 a response of running a machine learning model (prediction p and explanation e), and provide the option to make adjustments which can then be stored, for example, in a table or database, e.g., in the Feedback Rules Lookup Table 218. In one or more embodiments, the table can be in any structure or format, for example, any computer or machine readable or accessible data format. When making online predictions, one or more processors generates a response by activating previous user changes through the Feedback Rules Lookup Table 218 in order to influence the current prediction.

In an embodiment, the ML Layer 202 includes an ML model 212 and an explainer 214. In an embodiment, they are provided to the interactive overlay. For instance, they can be inputs to the interactive overlay. In an embodiment, the system and method need not be dependent on any specific ML model. In an embodiment, as shown in the online prediction phase 210, once the end-user 220 or application sends an instance and asks for a response, this request passes directly to the ML Layer 204. The ML Layer 204 then provides the initial prediction p through calling the ML model 212 along with an interpretable explanations e which is provided by the explainer 214. Algorithm 1 lines 2-3 illustrate an implementation of this process in an embodiment. In an embodiment the table 218 may be empty, initially, for example, there were no feedback received previously. Assuming no relevant user feedback is found the user 220 is then presented with both the prediction and the explanation and given the opportunity to modify e and/or p. Algorithm 1, line 13 illustrates an implementation of this process in an embodiment. These modifications (e' and p') are then stored in the Feedback Rule Lookup Table 218 along with an inferred transformation function t. As shown in the online prediction phase 210 in an embodiment, when making an online prediction the label p is used together with the explanation e for accessing the Feedback Rules Lookup Table 218 and retrieving relevant feedback rules. Algorithm 1, line 5 illustrates an implementation of this process in an embodiment. In an embodiment, the input instance $x_i$ is then evaluated against each one of the retrieved feedback rules. Algorithm 2, lines 2-15 illustrates an implementation of this process in an embodiment. The instance can either satisfy both, the original explanation rule and the feedback rule, or only one of the two rules. Algorithm 2, line 5 illustrates an implementation of this process in an embodiment. The latter condition occurs when the instance falls in between the decision boundaries of the two rules. If the input instance $x_i$ does not satisfy the feedback rule, p' is set to the other label. Algorithm 2, lines 6-7 illustrates an implementation of this process in an embodiment. If the model prediction p does not match p' the transformation is applied and the new result returned to the user. Algorithm 2, lines 8-13 illustrates an implementation of this process in an embodiment.

Algorithm 1 illustrates an example pseudo-code for generating a response in an embodiment.

Algorithm 1: GenerateResponse

```
Input: x_i: data input instance
ERS: Explainer Rule Set
FRS: Feedback Rule Set
Output: responses: system response that appleis to x_i
1   response ← { }
2   p ← QueryMlModel(x_i)
3   explanations ← explain(x_i, p, ERS)
4   For each e in explanations do
5       candidate_fr ← RetrieveFeedBackRule(e, p, FRS)
6       response ← EvaluateFeedbackRules(x_i, p, candidate_fr)
    // no feedback rule matching explanation e and prediction p
7   If response is empty then
8       for each frs_entry in FRS do
9           e, candidate_fr ← frs_entry
10          if e not in explanations then
11              response ← EvaluateFeedbackRule (x_i, p, candidate_fr)
    // no feedback rule matching instance x_i
```

Algorithm 1: GenerateResponse

```
12  if response is empty then
13      response ← p, random_select(explanations)
14  return response
```

Algorithm 2 illustrates an example pseudo-code for evaluating feedback rules in an embodiment.

Algorithm 2: EvaluateFeedbackRules

```
Input: x_i: data input instance
e: explanation rule,
p: prediction
candidate_fr: list of feedback rules to search for applicability to x_i
Output: response: system response that appleis to x_i
1   response ← { }
2   for each fr in candidate_fr do
3       R', t ← fr
4       e', p' ← R'
5       if x_i satisfies e or x_i satisfies e' then
6           if x_i not satisfies e' then
7               p' ← GetOtherLabel(p')
8           if p ≠ p' then
9               x'_i ← t(x_i)
10              new_p ← QueryMlModel(x'_i)
11              response ← new_p, p', e', t.description
12              if new_p = p' then
13                  return response
14          else
            // model is already capturing this rule
15              return response ← p, p', e'
16  return response
```

In one or more embodiments, the system and method disclosed herein can work with any ML model. In an embodiment, for example, since users can provide feedback on the explanations, both the explanations and the feedback are implemented to have the same structure. In an embodiment, rules in the form of Boolean rule set logic can model a decision making process. Such rules are composed of if-then statements that predict the label, and can be completely transparent and interpretable to the user. In an embodiment, both the explanations and the feedback can be in the form of if-then statement, or formally, boolean rules. To produce explanations to support the prediction from an ML model, the system and/or method in one or more embodiments can leverage a Boolean Rule Column Generation (BRCG) framework. This framework produces a disjunctive normal form (DNF) representation of a logical formula to predict a class label for an instance, where the class label can be either the ground truth label or the label provided by an ML model. BRCG can be used for binary classification models, and it can also be generalized to multi-class problems using a one-vs.-rest configuration. The system and method disclosed herein in one or more embodiments can use other explainer models, and in one or more embodiments, the explanations can be mapped to boolean rules. For example, given a binary classifier M(Y|X) which predicts Y given X, two sets of rules are generated using BRCG which explain the predictions of the classifier for the two classes. By way of example, these two rule sets together form the Explainer Rule Set (ERS), which is used by the ML Layer 202. The feedback given by the users are stored as a feedback rule (FR). A feedback rule set (FRS) is the set of feedback rules that are stored in Feedback Rules LookUp Table 218.

In an embodiment, the User Modification Layer 204 is responsible for mapping user feedback into instance transformation functions. The user 220 can modify a clause by adding or removing one or more conditions or modifying existing conditions by changing the comparison operator, the value or both. Given an explainer clause such as age>26 ˆincome>50 k ˆ education="Level 1", examples of possible user modifications can include the following.

Add a condition: age>26 ˆincome>50 k ˆeducation="Level 1" ˆ occupation="Sales"

Delete a condition: income>50 k ˆeducation="Level 1"

Modify a value: age>30 ˆincome>50 k ˆeducation="Level 1"

Modify an operator: age<26 ˆincome>50 k ˆeducation="Level 1"

By way of example, given a prediction p from a binary classifier M(Y|X) and an explanation clause e, there can be 3 possible outcomes: 1) the prediction is correct and the explanation is correct as well (right for the right reasons); 2) the prediction is correct but the explanation is not (right for the wrong reasons); 3) the prediction is wrong and the explanation is also necessarily wrong (wrong for the wrong reasons). The system and method disclosed herein in one or more embodiment can enable the user to provide feedback in order to correct the model in cases 2 and 3. In an embodiment, for example, whenever the prediction is correct, but the user is not satisfied with the explanation clause, they can modify the clause to correctly reflect the reason behind the prediction (case 2). More formally, given an explanation clause e and a user input correction clause e', the system in an embodiment may define a function t: X→X such that Equation 1 holds.

$$\forall i \in \{1, \ldots, n\}, e'(x_i)=1 \Leftrightarrow e(t(x_i))=1 \quad (1)$$

The transformation t modifies only the instances that fall between the boundaries defined by e and e'. The instances are pushed inside or pulled outside the decision boundaries of the ML model for the target class p depending on whether the user is relaxing or narrowing the original boundaries defined by e. For instance, given as explanation e the clause age>26 ˆ income>50 k ˆeducation="Level 1" with a predicted class label p=1 and a user input correction clause e' as age>30 ˆ income>50 k ˆ education="Level 1", the function t is defined as if (age>26 ˆ age<30) then age=25. As the clause e' narrowed the boundaries on the feature age, the transformation is pushing the instances that fall within the interval defined by e (age>26) and e' (age<30) outside the decision boundaries of the ML model for class p=1. The margin between the new value assigned to the numeric feature and the boundaries defined by e and e' is configurable per feature and by default is set to 1 in an embodiment. For a categorical feature the transformation t draws a new value from the feature domain. Given the explanation clause e presented above and a correction clause e' as age>26 ˆ income>50 k ˆ education="Doctorate" where the condition on the categorical feature education has been changed, the inferred transformation t is described in Algorithm 3 by way of example.

Algorithm 3: Example of a transformation on a categorical feature when the class label is preserved Input: $x_i$: data input instance
E: set representing the domain of feature education
Output: $x'_i$: transformed instance
1    value ← $x_i$.education
2    If value = "Doctorate" then
3        new_value ← "Level 1"
4    Else if value = "Level 1" then
5        new_value ← random_select(E − {"Level 1"})

-continued

Algorithm 3: Example of a transformation on a categorical feature when the class label is preserved 6    $x_i$.education ← new_value
7    return $x_i$ The user is also able to correct a model when a prediction is wrong (case 3) by changing the label. Formally, given a clause e, a prediction label p, a user input correction clause e' and a user label p' where p'≠p, the transformation function t: X→X iscan be defined such that Equation 2 holds.

$$\forall i \in \{1, \ldots, n\}, e'(x_i)=1 \Leftrightarrow e(t(x_1))=0 \quad (2)$$

The transformation t pushes all instances outside the decision boundaries of the ML model for class label p. For example, given as explanation e the clause age>26 ˆ income>50 k ˆ education="Level 1", a user correction clause e' as age>30 ˆ income>50 k ˆ education="Level 1", and a new predicted class label p' such that p≠p', the resulting transformation t is shown in Algorithm 4, by way of example. In one or more embodiments, a transformation function 216 can be automatically generated. For example, there can be a number of pre-defined templates or template functions, and each pre-defined template can provide a higher-order function. Such pre-defined template or higher-order function can be populated with the specific value and field modified by the user. For example, the system can generate a transformation function automatically by detecting how the user changed the original rule. In one or more embodiments, different transformation functions can be implemented or used, for example, which can cover each possible way a user may correct a Boolean expression, e.g. changing the comparison operators <, ≤, >, ≥, =, ≠, the values or adding/removing a whole condition. One or more algorithms or functions that can flip or adjust the prediction outcome of the ML model, e.g., identify these flip or adjustment, points can be used. An example method can be an adoption of contrastive explanation for identifying the new value to assign to a feature. For example, a contrastive explanation can tell to what value a feature can be set or transformed.

Algorithm 4: Example of a transformation on a numeric feature when the class label is changed Input: $x_i$: data input instance
margin: margin between the new value and the boundaries
Output: $x'_i$: transformed instance
1    value ← $x_i$.age
2    If value > 30 then
3        new_value ← 26 − margin
4    else if value ≤ 26 then
5        new_value ← 26 + margin
6    $x_i$.age ← new_value
7    return $x_i$ While the above description, in an embodiment, assumed that an approximation for the decision boundaries are given by the clauses of the BRCG framework and so the instance transformation used these decision boundaries to transform the input instance, other methodologies can be leveraged such as but not limited to detecting "flip points" for these values.

Referring to FIG. 2, when an input instance $x_i$ is presented to the system, the prediction label p and the explanation e are used as a lookup to the Feedback Rules Lookup Table 218 in order to retrieve any Feedback Rules FR. Algorithm 1, line 5 shows an implementation of this process in an embodiment. By way of example, it may be that the rules are not necessarily non-overlapping. It may be possible there are multiple explanations for a single instance. In an embodiment, the system and method disclosed herein can evaluate all explanations. In an embodiment, an FR is said to apply to instance $x_i$ if $x_i$ satisfies e'. In such case the transformation function t is applied to generate $x'_i$ which is then given as new input to the machine learning model 212. In an embodiment, when an instance $x_i$ satisfies at least one of the two rules e and e', and p' differs from the model prediction p, then the transformation function t can be applied to generate $x'_i$ which is then given as new input to the machine learning model 212. In an embodiment, if the transformation results in a modification of p to p' then the modified result is returned to the user along with the user contributed modification e' and the transformation performed. Algorithm 2 at lines 8-13 illustrates an example implementation of this process in an embodiment.

If no user rule results in a modification, the system may return the last seen FR that applied to the instance or whose related explanation e applied to the instance. For example, once a model is re-trained a new set of explanation rules is generated. In this scenario, some previously corrected explanation rules may not be identified anymore by the explainer. For instance, there may be rules in the Feedback Rule Lookup Table 218 that are no longer returned from the Explainer. In an embodiment, in order to avoid the user provide the same correction repeatedly after each retraining, the system disclosed herein in an embodiment, retains the old entries and checks whether they apply to the current instance. For example, in an embodiment, the system can evaluate all remaining feedback rules.

If no user rules are found at all, the system may return the explanation rule R to the user with the option for the user to provide feedback. In an embodiment, a feedback rule may have decision boundaries that are looser than those defined by the original explanation rule, that is, an input instance that satisfies the feedback rule may not satisfy the original explanation rule. To handle this scenario, in an embodiment, all remaining feedback rules can be evaluated against the instance. Algorithm 1 lines 8-11 illustrate an example implementation of this process. In an embodiment, the system may accommodate both hard constraints and soft constraints. For example, some domains may have hard constraints (hc) such as regulatory compliance. In a scenario having a hard constraint, the system may return both the transformed prediction $M(x'_i)$ as well as the user input prediction p'. For example, if the application requires treating the constraint as a hard constraint then p' can be used, if the user feedback is treated as a soft constraint (sc) then the prediction on the transformed instance is used. In an embodiment, a hard constraint implies that the rules have higher priority than the ML model. For instance, if a rule e applies to an instance then the label assigned to this instance is the one provided by the rule. In an embodiment, with the soft constraint the ML model can be the one that provides the decision on the label to assign to the instance since the system applies a transformation to the instance and then submits it back to the ML model for a second evaluation.

In an embodiment, the system may accommodate a scenario where rule based explanations may change after model retraining, and as a result there may be rules in the Feedback Rule Lookup Table 218 that are no longer returned from the explainer 214, which the system may need to honour. In an embodiment, if the current explanations do not serve as a lookup, the system can evaluate each user Feedback Rule against the instance. By way of example, algorithm 1 at line 8 illustrates an example implementation of this process.

Another example scenario can be a game playing example, for example, Tick-Tack-Toe, in which a predicate is deleted from an original rule in an updated rule. For example, consider that an original rule for a win included tl==x AND tm==x AND tr==x AND br==b. For example, a trained machine learning model responds with a win and an explainer provides an explanation that the win decision by the trained machine learning model is based on the original rule being satisfied. Consider that a user updates the rule to tl==x AND tm==x AND tr==x, removing br==b. In a test instance, tl==x AND tm==x AND tr==x AND br==0, the machine learning model would respond with !win (not win). An interactive overlay described herein in an embodiment may transform the test instance to include br==b, to a new test instance, and run the machine learning model with the new test instance. With the new test instance, the machine learning model would respond with a win decision.

In one or more embodiments, the system and method can improve the performance of an underlying machine learning model, for example, inbetween retrains, by combining ML predictions with user contributed modifications to prediction explanations. In one or more embodiments, the system and method can provide a solution that allows users to provide modifications to interpretable explanation, e.g., in the form of rules such as Boolean rules. In an embodiment, these rules can be applied in an online fashion in order to adapt to dynamic policy changes. For example, machine learning models such as, but not limited to, those in regulated enterprises, for example, finance and healthcare, can encode policy directives, for example, including those directives, which are generally not part of the data fabric. The system and method disclosed herein in one or more embodiments can allow policy experts to encode domain-specific directives and can apply appropriate transformations to existing ML decision boundaries at the time the directives take effect, for example, in real-time. In an aspect, once the ML training procedure has caught up with the policy change the decision rule may be promoted from the interaction layer to a constraint in the ML training process.

Figure 3:
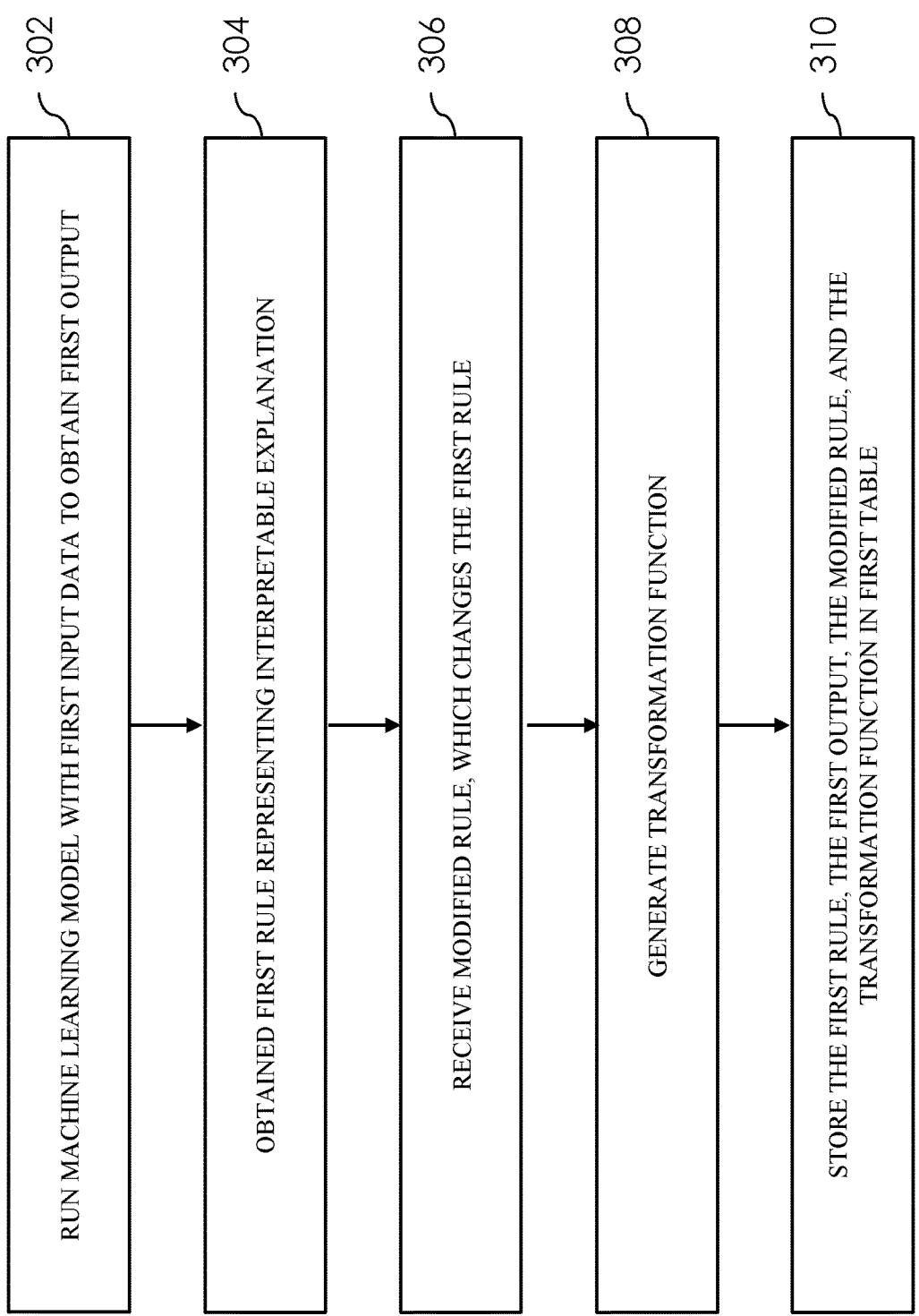
FIG. 3 is a flow diagram illustrating a method in an embodiment.

FIG. 3 is a flow diagram illustrating a method in an embodiment. The method illustrates incorporating user feedback to a machine learning model in an embodiment. The method can be performed or implemented on one or more processors such as computer processors and/or hardware processors. At 302, a machine learning model is run with a first input data to obtain a first output from the machine learning model. By way of example, FIG. 2 shows such machine learning model 212 and the first input data can be Instance $x_i$, for example, shown in the user feedback phase 208.

At 304, a first rule is obtained representing an interpretable explanation for the machine learning model predicting the first output. By way of example, the interpretable explanation or the first rule can be explanation e and the first output can be prediction p shown in FIG. 2, for example, shown in the user feedback phase 208.

At 306, a modified rule, which changes the first rule, can be received. For example, a user or another entity can provide the modified rule, for example, as feedback to the explanation e. For example, the modified rule can be e' shown in FIG. 2, for example, shown in the user feedback phase 208.

At 308, a transformation function can be generated. In an embodiment, the transformation function transforms a given input data for inputting to the machine learning model to a new input data based on decision boundaries of the machine learning model and the modified rule. For example, the transformation function can be at least part of the transformer 216 shown in FIG. 2. The new input data can be x'$_i$ shown in FIG. 2.

At 310, the first rule, the first output, the modified rule, and the transformation function can be stored in a first table. In an embodiment, the first table can be structured in a format, which can be looked up or searched. For example, the first table can be Feedback Rules Lookup Table 218 shown in FIG. 2.

Figure 4:
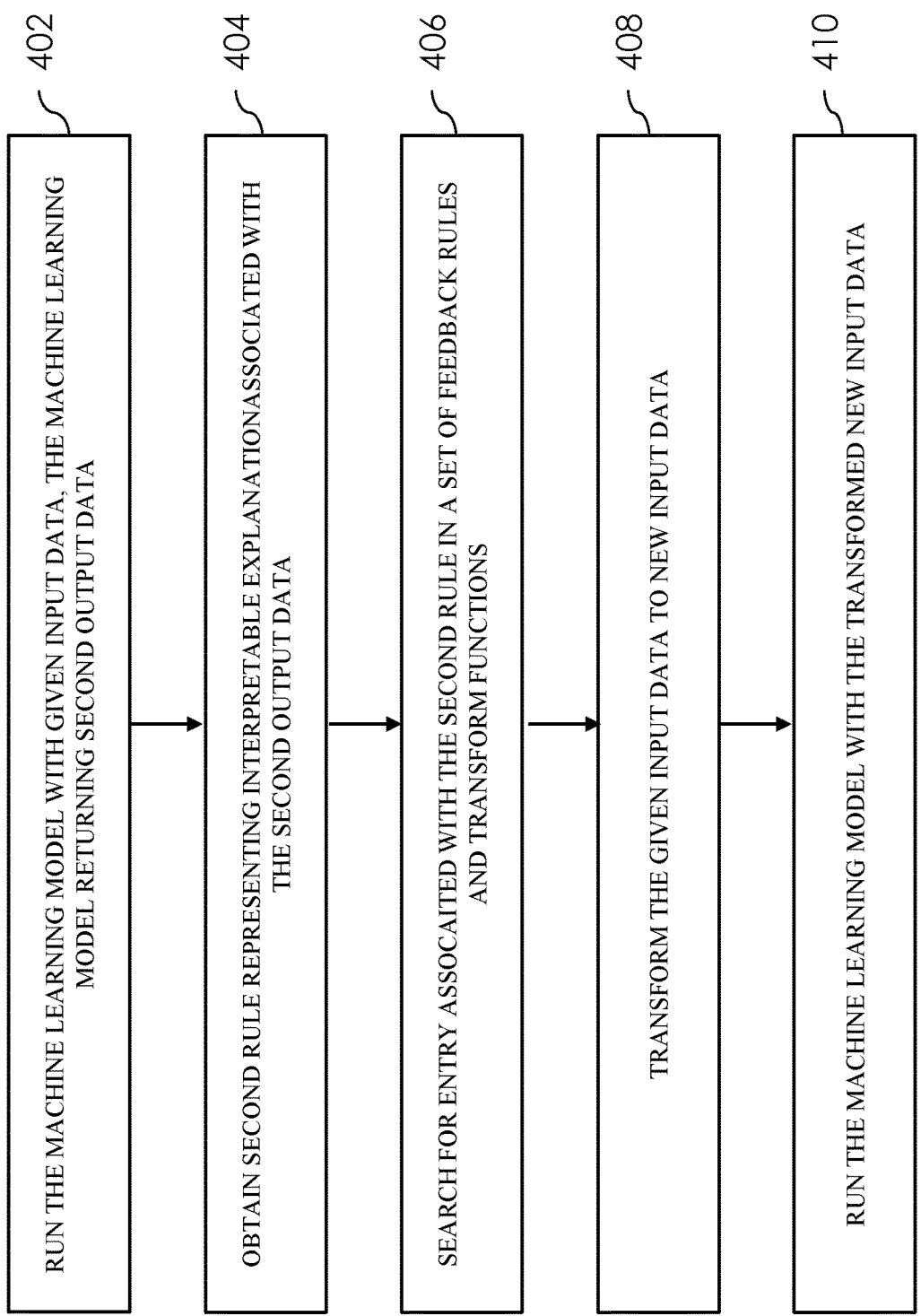
FIG. 4 is another flow diagram illustrating a method in an embodiment.

FIG. 4 is another flow diagram illustrating a method in an embodiment. The method illustrates online prediction incorporating user feedback to a machine learning model in an embodiment. The method can be performed or implemented on one or more processors such as computer processors and/or hardware processors. At 402, the machine learning model is run with a given input data. The machine learning model generates a second output data. By way of example, FIG. 2 shows such machine learning model 212 and the given input data can be Instance x, shown in FIG. 2, for example, in online prediction phase 210. Instance x, can be the same x, shown in the user feedback phase 208 or a different input data.

At 404, a second rule representing an interpretable explanation for the machine learning model predicting the second output can be obtained. By way of example, the interpretable explanation or the second rule can be explanation e and the second output can be prediction p shown in FIG. 2, for example, in online prediction phase 210.

At 406, a search is performed on the first table for an entry associated with the second rule. For example, FIG. 2 in the online prediction phase 210 at 218 illustrates this search process.

At 408, responsive to finding the entry and determining that the given input data satisfies the modified rule in the entry, the given input data can be transformed to a new input data using the transformation function in the entry. For instance, a transformation or transformer can be applied to the given input data so as to transform it to the new input data. By way of example, the transformation function or transformer being applied is shown at 216 in FIG. 2 in the online prediction phase 210. For example, x'$_i$=t(x$_i$).

At 410, the machine learning model can be run with the new input data. The response of the machine learning model can be returned. For example, the machine learning model's prediction based on the new input data (M(x'$_i$)), optionally modified prediction (p') if any were provided, for example, by the user, modified explanation (e') and the transformation function applied to the given input data (t) can be returned.

Figure 5:
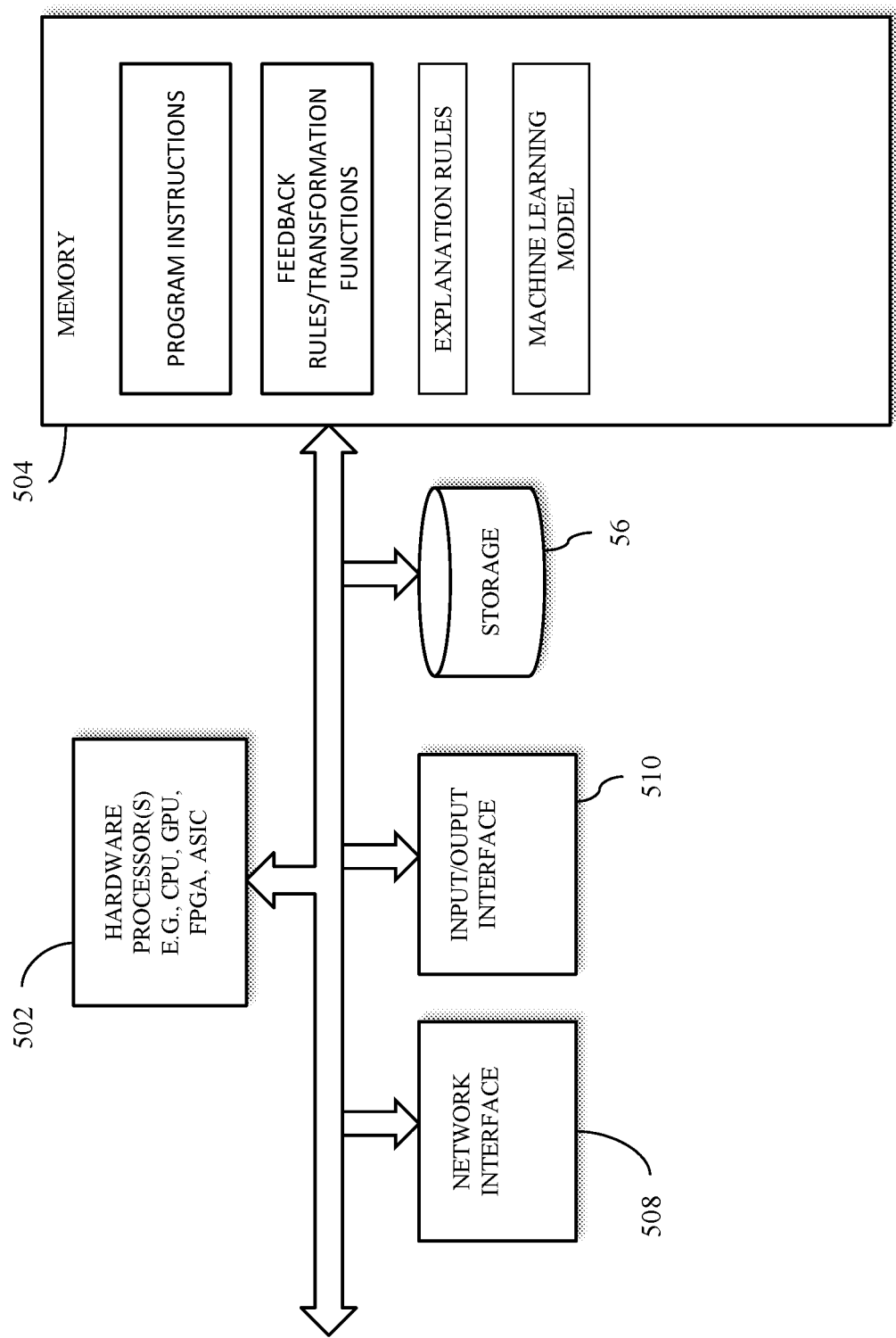
FIG. 5 is a diagram showing components of a system in one embodiment that can provide an interactive overlay to a machine learning model or framework.

FIG. 5 is a diagram showing components of a system in one embodiment that can provide an interactive overlay to a machine learning model or framework. One or more hardware processors 502 such as a central processing unit (CPU), a graphic process unit (GPU), and/or a Field Programmable Gate Array (FPGA), an application specific integrated circuit (ASIC), and/or another processor, may be coupled with a memory device 504, and perform one or more interactive overlay processing described herein. A memory device 504 may include random access memory (RAM), read-only memory (ROM) or another memory device, and may store data and/or processor instructions for implementing various functionalities associated with the methods and/or systems described herein. One or more processors 502 may execute computer instructions stored in memory 504 or received from another computer device or medium. A memory device 504 may, for example, store instructions and/or data for functioning of one or more hardware processors 502, and may include an operating system and other program of instructions and/or data. One or more hardware processors 502 may receive input or reference to a machine learning model, an explainer, associated training data and a database of explanations, for example, which are interpretable. For instance, at least one hardware processor 502 may perform interactive overlay processing as described herein, in an embodiment. In one aspect, input information or data may be stored in a storage device 506 or received via a network interface 508 from a remote device, and may be temporarily loaded into a memory device 504 for interactive overlay processing. A generated table of feedback rules and transformation functions may be stored on a storage device 506 or memory device 504, for example, for running by one or more hardware processors 502. One or more hardware processors 502 may be coupled with interface devices such as a network interface 508 for communicating with remote systems, for example, via a network, and an input/output interface 510 for communicating with input and/or output devices such as a keyboard, mouse, display, and/or others.

Figure 6:
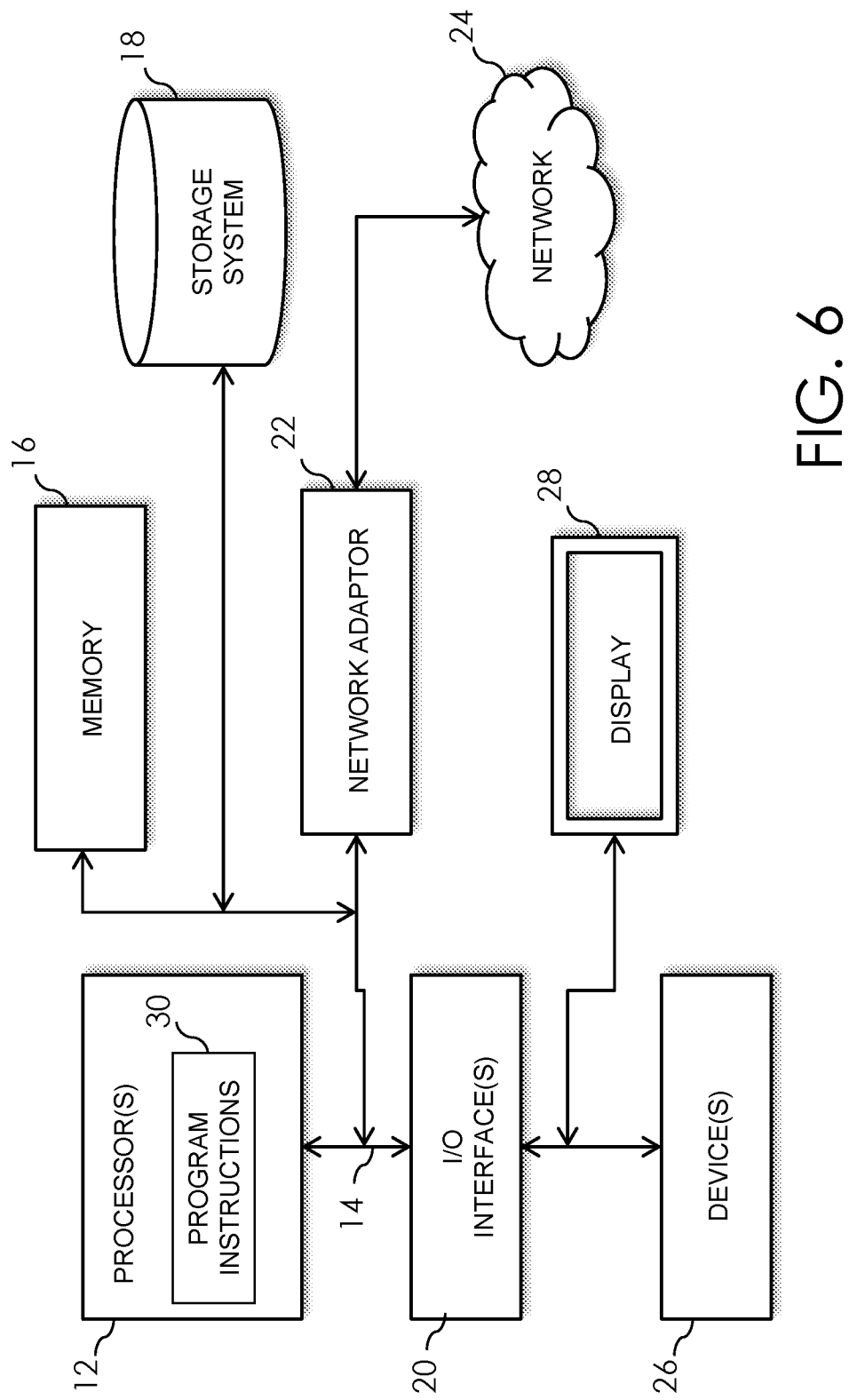
FIG. 6 illustrates a schematic of an example computer or processing system that may implement a system according to one embodiment.

FIG. 6 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
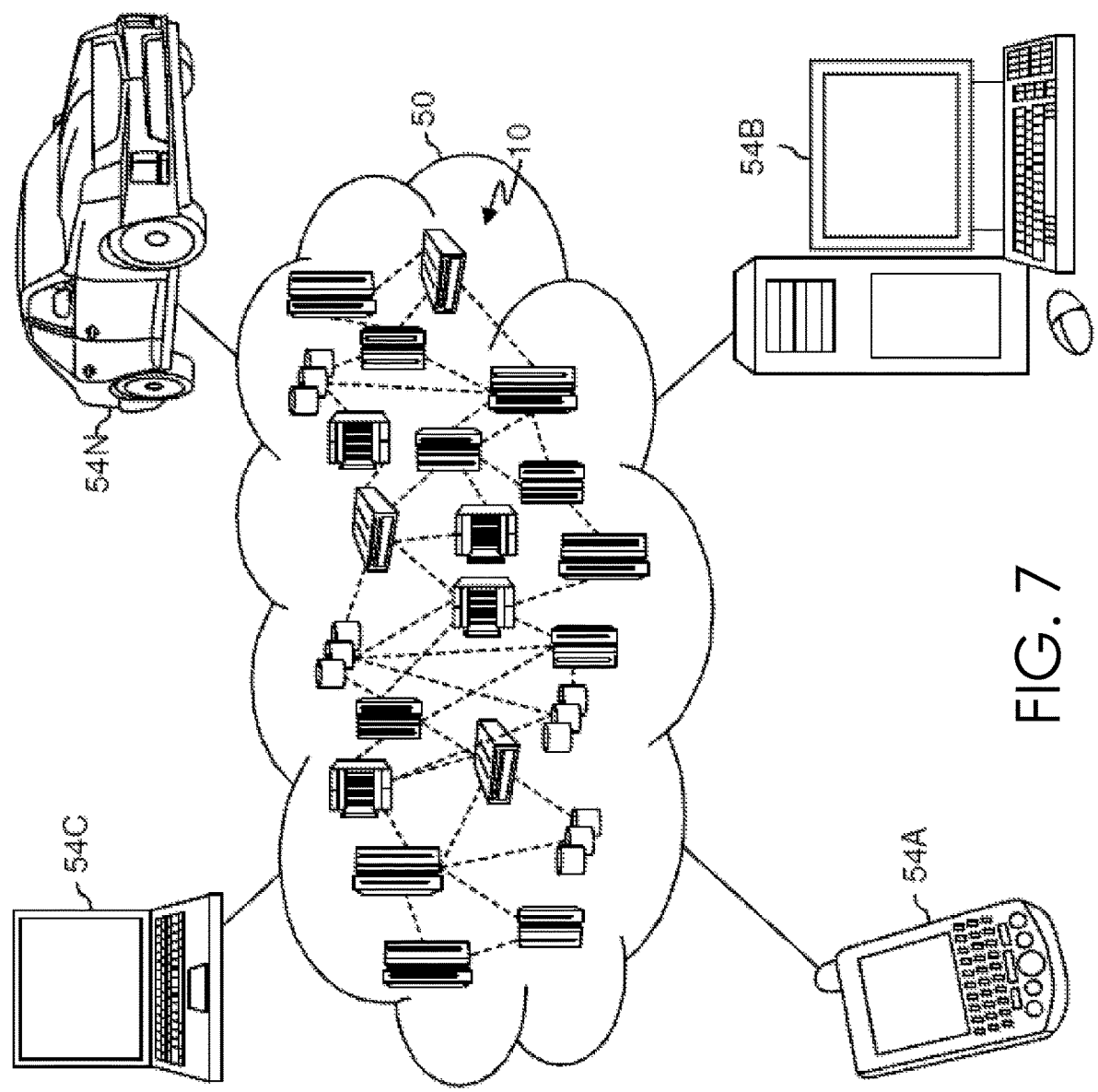
FIG. 7 illustrates a cloud computing environment in one embodiment.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
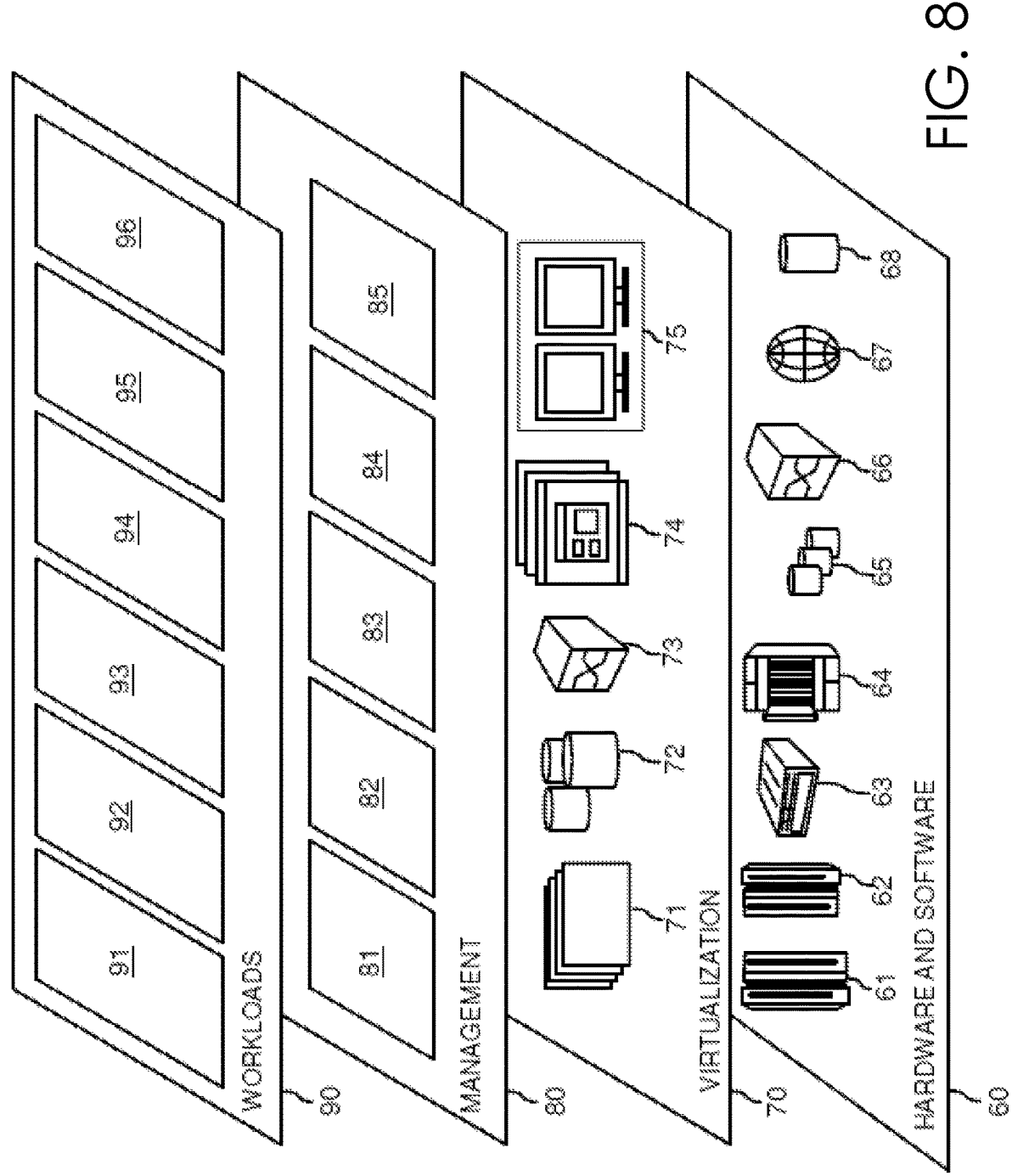
FIG. 8 illustrates a set of functional abstraction layers provided by cloud computing environment in one embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and interactive overlay processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
    running a machine learning model with a first input data to obtain a first output from the machine learning model;
    obtaining a first rule representing an interpretable explanation for the machine learning model predicting the first output;
    receiving a modified rule, which changes the first rule;
    based on decision boundaries of the machine learning model of the first rule and the modified rule, generating a transformation function, which transforms a given input data for inputting to the machine learning model to a new input data, wherein responsive to the first rule being changed by being narrowed, the transformation function transforms the given input data that is within the decision boundaries of the machine learning model to the new input data that is outside the decision boundaries of the machine learning model; and storing the first rule, the first output, the modified rule, and the transformation function in a first table.

2. The method of claim 1, further comprising:
running the machine learning model with the given input data, the machine learning model generating a second output data;
obtaining a second rule representing an interpretable explanation for the machine learning model predicting the second output;
searching the first table for an entry associated with the second rule;
responsive to finding the entry and determining that the given input data satisfies the modified rule in the entry, transforming the given input data to the new input data using the transformation function in the entry; and
running the machine learning model with the new input data.

3. The method of claim 2, wherein the interpretable explanation for the machine learning model predicting the second output is obtained by running at least one explainer.

4. The method of claim 2, further including providing a prediction result of the machine learning model run with the new input data.

5. The method of claim 1, wherein the modified rule changes a condition specified in the first rule.

6. The method of claim 1, wherein the modified rule changes an output label associated with the first rule.

7. The method of claim 1, wherein the first table is structured such that the first table is indexed at least by the first rule.

8. The method of claim 1, wherein the interpretable explanation for the machine learning model predicting the first output is obtained by running at least one explainer.

9. The method of claim 1, further including resolving a conflict between the first rule and the modified rule.

10. The method of claim 1, wherein the modified rule is received from a user.

11. A system comprising:
at least one processor;
a memory device coupled with the at least one processor;
the at least one processor configured to at least:
run a machine learning model with a first input data to obtain a first output from the machine learning model;
obtain a first rule representing an interpretable explanation for the machine learning model predicting the first output;
receive a modified rule, which changes the first rule;
based on decision boundaries of the machine learning model of the first rule and the modified rule, generate a transformation function, which transforms a given input data for inputting to the machine learning model to a new input data, wherein responsive to the first rule being changed by being narrowed, the transformation function transforms the given input data that is within the decision boundaries of the machine learning model to the new input data that is outside the decision boundaries of the machine learning model; and
store the first rule, the first output, the modified rule, and the transformation function in a first table.

12. The system of claim 11, wherein the at least one processor is further configured to:
run the machine learning model with the given input data, the machine learning model generating a second output data;
obtain a second rule representing an interpretable explanation for the machine learning model predicting the second output;
search the first table for an entry associated with the second rule;
responsive to finding the entry and determining that the given input data satisfies the modified rule in the entry, transform the given input data to the new input data using the transformation function in the entry; and
run the machine learning model with the new input data.

13. The system of claim 11, wherein the modified rule changes a condition specified in the first rule.

14. The system of claim 11, wherein the modified rule changes an output label associated with the first rule.

15. The system of claim 11, wherein the at least one processor is further configured to structure the first table such that first table is indexed at least by the first rule.

16. The system of claim 11, wherein the interpretable explanation for the machine learning model predicting the first output is obtained by running at least one explainer.

17. The system of claim 11, wherein the at least one processor is further configured to resolve a conflict between the first rule and the modified rule.

18. The system of claim 11, wherein the modified rule is received from a user.

19. A computer program product comprising a computer readable storage medium having program instructions embodied therewith, the program instructions readable by a device to cause the device to:
run a machine learning model with a first input data to obtain a first output from the machine learning model;
obtain a first rule representing an interpretable explanation for the machine learning model predicting the first output;
receive a modified rule, which changes the first rule;
based on decision boundaries of the machine learning model of the first rule and the modified rule, generate a transformation function, which transforms a given input data for inputting to the machine learning model to a new input data, wherein responsive to the first rule being changed by being narrowed, the transformation function transforms the given input data that is within the decision boundaries of the machine learning model to the new input data that is outside the decision boundaries of the machine learning model; and
store the first rule, the first output, the modified rule, and the transformation function in a first table.

20. The computer program product of claim 19, wherein the device is further caused to:
run the machine learning model with the given input data, the machine learning model generating a second output data;
obtain a second rule representing an interpretable explanation for the machine learning model predicting the second output;
search the first table for an entry associated with the second rule;
responsive to finding the entry and determining that the given input data satisfies the modified rule in the entry, transform the given input data to the new input data using the transformation function in the entry; and
run the machine learning model with the new input data.

* * * * *